(12) United States Patent
Feifel et al.

(10) Patent No.: US 10,131,359 B2
(45) Date of Patent: Nov. 20, 2018

(54) COMMUNICATION SYSTEM FOR A VEHICLE

(71) Applicant: Continental Teves AG & Co. oHG, Frankfurt (DE)

(72) Inventors: Harald Feifel, Darmstadt (DE); Daniel Förster, Darmstadt (DE); Attila Jaeger, Darmstadt (DE); Richard Scherping, Liederbach am Taunus (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/601,349

(22) Filed: May 22, 2017

(65) Prior Publication Data

US 2017/0334449 A1 Nov. 23, 2017

(30) Foreign Application Priority Data

May 23, 2016 (DE) .................. 10 2016 208 846

(51) Int. Cl.

| | |
|---|---|
| *B60W 40/04* | (2006.01) |
| *B60R 16/023* | (2006.01) |
| *G08G 1/09* | (2006.01) |
| *H04B 1/3822* | (2015.01) |
| *G08G 1/0967* | (2006.01) |
| *G08G 1/16* | (2006.01) |

(Continued)

(52) U.S. Cl.
CPC ......... *B60W 40/04* (2013.01); *B60R 16/0231* (2013.01); *G08G 1/091* (2013.01); *G08G 1/09675* (2013.01); *G08G 1/096716* (2013.01); *G08G 1/096741* (2013.01); *G08G 1/096791* (2013.01); *G08G 1/163* (2013.01); *H04B 1/3822* (2013.01); *H04W 84/005* (2013.01); *H04W 84/18* (2013.01); *B60W 2550/408* (2013.01); *B60W 2750/306* (2013.01); *B60W 2750/308* (2013.01); *B60W 2750/40* (2013.01); *G01S 19/01* (2013.01); *G01S 2205/002* (2013.01); *G08G 1/166* (2013.01)

(58) Field of Classification Search
CPC ..................................................... B60W 40/04
USPC ......................................................... 340/903
See application file for complete search history.

(56) References Cited

U.S. PATENT DOCUMENTS

| | | | | |
|---|---|---|---|---|
| 5,845,725 A | * | 12/1998 | Kawada | ............... G05D 1/0265 180/167 |
| 6,437,688 B1 | * | 8/2002 | Kobayashi | ............ G01S 15/931 180/167 |

(Continued)

OTHER PUBLICATIONS

German Search Report for German Application No. 10 2016 208 846.7, dated Mar. 27, 2017, including partial English translation, 10 pages.

*Primary Examiner* — Santiago Garcia
(74) *Attorney, Agent, or Firm* — RatnerPrestia (57) ABSTRACT

A communication system for a vehicle, with a processor designed to determine a driving situation of the vehicle, and a communication interface designed to receive V2X communication data of a first additional vehicle, wherein the V2X communication data defines a driving situation of the first additional vehicle, wherein the processor is designed to detect a second additional vehicle which is located between the vehicle and the first additional vehicle on the basis of the determined driving situation of the vehicle and the driving situation of the first additional vehicle.

19 Claims, 3 Drawing Sheets

(51) Int. Cl.
*H04W 84/00* (2009.01)
*H04W 84/18* (2009.01)
*G01S 19/01* (2010.01)

(56) References Cited

U.S. PATENT DOCUMENTS

| | | | |
|---|---|---|---|
| 7,304,589 | B2 | 12/2007 | Kagawa |
| 8,818,682 | B1* | 8/2014 | Dolgov ................ G05D 1/0055 180/167 |
| 2010/0198513 | A1 | 8/2010 | Zeng et al. |
| 2011/0285574 | A1* | 11/2011 | Tsunekawa ............... G01S 7/40 342/70 |
| 2013/0024103 | A1* | 1/2013 | Schneider ............. B60W 40/04 701/301 |
| 2013/0278440 | A1* | 10/2013 | Rubin ...................... G08G 9/02 340/903 |
| 2014/0036076 | A1* | 2/2014 | Nerayoff ............... H04N 7/181 348/148 |
| 2014/0107890 | A1* | 4/2014 | Funabashi ............. G08G 1/22 701/36 |
| 2014/0303845 | A1* | 10/2014 | Hartmann ............. B60W 10/18 701/41 |
| 2016/0328968 | A1* | 11/2016 | Elsheemy ................ G01S 19/13 |
| 2017/0091565 | A1* | 3/2017 | Yokoi ................ G06K 9/00805 |
| 2017/0120911 | A1* | 5/2017 | Shin ...................... B60W 30/16 |
| 2017/0153644 | A1* | 6/2017 | Otsuka ................ G05D 1/0214 |
| 2017/0178498 | A1* | 6/2017 | Mcerlean ............. G08G 1/0112 |
| 2017/0190331 | A1* | 7/2017 | Gupta .................. B60W 30/18 |
| 2017/0287338 | A1* | 10/2017 | Neubecker ............ G08G 1/168 |
| 2017/0327123 | A1* | 11/2017 | Tokimasa ............. B60W 40/04 |

* cited by examiner

COMMUNICATION SYSTEM FOR A VEHICLE

CROSS REFERENCE TO RELATED APPLICATIONS

This application claims priority to German Patent Application 10 2016 208 846.7, filed May 23, 2016, the contents of such application being incorporated by reference herein.

FIELD OF THE INVENTION

The present invention relates to a communication system and a method for a vehicle for determining a traffic situation.

BACKGROUND OF THE INVENTION

Driver assistance systems support the driver in certain driving situations. For example, a driver assistance system is designed to warn a driver in a critical situation of a vehicle driving in front, or to brake their own vehicle autonomously.

Driver assistance systems can be realized using internal sensors of the vehicle, for example radar- or camera-based environment sensors, for detecting other vehicles around one's own vehicle. In a vehicle with a V2X (vehicle-to-X) (a.k.a. vehicle to anything) communication system, other vehicles can also be determined on the basis of received V2X communication data of the other vehicles. X can be any entity or thing that affects the vehicle or vice versa, including, but not limited to, other vehicles, a grid, infrastructure, and/or people.

The use of V2X communication data of other vehicles in a driver assistance system does however require the other vehicles to be equipped with a V2X communication system and to transmit V2X communication data. If the driver assistance system in a traffic situation has neither sensor data in internal sensors, nor V2X communication data from other vehicles, the driver assistance system cannot determine the traffic situation, in particular the position of the other vehicles, and can therefore not react to the other vehicles.

SUMMARY OF THE INVENTION

An aspect of the present invention is an efficient concept for a vehicle for detecting other vehicles, in particular for detecting other vehicles which transmit no V2X communication data. The task is attained by means of the subjects of the independent claims. Advantageous embodiments of the invention are the subject of the dependent claims, the description and the figures.

According to one first aspect, the invention relates to a communication system for a vehicle with a processor designed to determine a driving situation of the vehicle, and a communication interface designed to receive V2X communication data of a first additional vehicle, wherein the V2X communication data defines a driving situation of the first additional vehicle, wherein the processor is designed to detect a second additional vehicle which is located between the vehicle and the first additional vehicle on the basis of the determined driving situation of the vehicle and the driving situation of the first additional vehicle. As a result, the advantage is achieved that vehicles which themselves do not transmit V2X communication data can be efficiently detected. In response to the detection of an additional vehicle, a safety function and/or a driver assistance system of the vehicle can be triggered in order to inform the safety function or the driver assistance system about the existence of the additional vehicle.

The detection of the second additional vehicle can comprise a determination and/or an estimation or assessment of the existence of the second additional vehicle.

The vehicle, the first additional vehicle and the second additional vehicle can respectively be a motor vehicle, in particular a multi-track motor vehicle such as a passenger car, a lorry or a bus, or a single-track motor vehicle such as a motorbike. Further, the vehicle, the first additional vehicle and the second additional vehicle can respectively be designed for autonomous or highly automated forward movement.

The vehicle and the first additional vehicle can respectively be equipped with a V2X communication system, via which V2X communication data is periodically transmitted. The transmitted V2X communication data can respectively comprise information on the current driving situation of the vehicle or the first additional vehicle. The second additional vehicle is for example a vehicle without a V2X communication system, and does not transmit any V2X communication data.

The communication system according to an aspect of the invention can here be integrated into the V2X communication system of the vehicle, or be implemented as a V2X communication system of the vehicle.

The communication interface can be a wireless V2X communication interface. The communication interface can be connected with at least one vehicle antenna, and can be designed for receiving and/or transmitting V2X communication data. The communication interface can be connected with a V2X communication chip of the vehicle, or be integrated in a V2X communication chip of the vehicle.

The processor can be integrated in an electronic control unit (ECU) of the vehicle, or can be implemented as a control unit of the vehicle. The processor can further comprise a microprocessor, or be implemented as a microprocessor.

The processor can be connected using communications technology with the communication interface, in order to receive the V2X communication data which defines the driving situation of the first additional vehicle. The processor can be designed to evaluate the V2X communication data in order to determine the driving situation of the first additional vehicle. The processor and the communication interface can be respectively connected to a communication network of the vehicle, in particular a vehicle bus.

The V2X communication data can comprise driving data and/or position data of the first additional vehicle.

According to one embodiment, the processor can be connected to a communication network of the vehicle, in particular a vehicle bus, wherein the processor is designed to receive communication data, in particular sensor data, via the communication network, and to determine the driving situation of the vehicle on the basis of the communication data received. As a result, the advantage is achieved that the processor can efficiently determine the driving situation of the vehicle. Vehicle sensors such as wheel rotation speed sensors or distance sensors can be connected to the communication network, which are designed to generate the communication data and transmit it to the processor.

According to one embodiment, the determined driving situation of the vehicle and the defined driving situation of the V2X communication data of the first additional vehicle respectively comprise a speed and a position of the vehicle or of the first additional vehicle.

The speed and the position of the vehicle can respectively be determined by one of the vehicle sensors and transmitted to the processor via the communication network. The position of the vehicle is here determined by a GNSS sensor of a navigation facility of the vehicle, for example, and is transferred to the processor using communications technology, in particular via the communication network.

According to one embodiment, the processor is designed, on the basis of the respective position and the respective speed of the vehicle and of the first additional vehicle, to determine a movement direction of the vehicle and of the first additional vehicle, wherein the processor is designed to refer to the driving situation of the first additional vehicle only for the purpose of detecting the second additional vehicle, when the respective movement directions of the vehicle and the first additional vehicle are the same, in particular the same for a first time interval. As a result, the advantage is achieved that V2X communication data of additional V2X vehicles which do not move in the direction of driving of the vehicle, but for example on an oncoming lane, can be ignored during the detection of the second additional vehicle. Thus, it can be ensured that the detection of the second additional vehicle cannot be interrupted or falsified by communication data from other V2X vehicles, which are e.g. driving towards the vehicle.

According to one embodiment, the processor is designed, on the basis of the respective direction of movement and the respective position of the vehicle and of the first additional vehicle, to determine whether the first additional vehicle is located in the driving direction in front of the vehicle, wherein the processor is designed to refer to the driving situation of the first additional vehicle only for the purpose of detecting the second additional vehicle, when the first additional vehicle is located in the driving direction in front of the vehicle, in particular for a second time interval in the driving direction in front of the vehicle. As a result, the advantage is achieved that V2X communication data of additional V2X vehicles which are not located in front of the vehicle can be ignored during the detection of the second additional vehicle. Thus, it can be ensured that the detection of the second additional vehicle cannot be interrupted or falsified by communication data from other V2X vehicles, which are e.g. driving behind the vehicle.

According to one embodiment, the processor is designed, on the basis of the position of the vehicle and the position of the first additional vehicle, to determine whether the vehicle and the first additional vehicle are located on a same driving lane, wherein the processor is designed to refer to the driving situation of the first additional vehicle only for the purpose of detecting the second additional vehicle, when the vehicle and the first additional vehicle are located on the same driving lane, in particular when they are located for a third time interval on the same driving lane. As a result, the advantage is achieved that V2X communication data of additional V2X vehicles which are moving in the same driving direction but in a different driving lane can be ignored during the detection of the second additional vehicle. Thus, it can be ensured that the detection of the second additional vehicle cannot be interrupted or falsified by communication data from other V2X vehicles, which are driving on a different driving lane than the vehicle.

According to one embodiment, the processor is designed, on the basis of the respective positions of the vehicle of the first additional vehicle, to determine a distance between the first additional vehicle and the vehicle, wherein the processor is designed to refer to the driving situation of the first additional vehicle only for the purpose of detecting the second additional vehicle, when the distance between the vehicle and the first additional vehicle lies within a first distance interval, in particular when it lies for a fourth time interval within the first distance interval. As a result, the advantage is achieved that V2X communication data of additional V2X vehicles which move at a great distance from the vehicle can be ignored during the detection of the second additional vehicle.

The first, second, third and fourth time interval can be pre-stored statical values or can be dynamically adapted by the processor on the basis of the current driving situation of the vehicle. The first, second, third and fourth time interval can be different or equal.

According to one embodiment, the determined driving situation of the vehicle and the driving situation of the first additional vehicle defined by the V2X communication data can further comprise an acceleration of the vehicle or of the first additional vehicle, wherein the processor is designed to determine an equally formed movement of the vehicle and of the first additional vehicle when the speed of the vehicle and of the first additional vehicle lies for a fifth time interval within a speed interval, and when the acceleration of the vehicle and of the first additional vehicle lies for a sixth time interval, in particular with a time delay, within an acceleration interval.

The fifth time interval, the sixth time interval and the speed interval and the acceleration interval can be pre-stored statical values or can be dynamically adapted by the processor on the basis of the current driving situation of the vehicle. The fifth time interval and the sixth time interval can be different or equal.

According to one embodiment, the processor is designed in response to a determination of a distance between the vehicle and the first additional vehicle, which lies within the first distance interval, and a simultaneous determination of an equally formed movement of the vehicle and of the first additional vehicle, to detect the second additional vehicle between the vehicle and the first additional vehicle. As a result, the advantage is achieved that the detection of the second additional vehicle can be determined efficiently, even if it does not itself transmit any V2X communication data.

According to one embodiment, the first distance interval is a statical value, or the processor is designed to determine the first distance interval dynamically on the basis of the driving situation of the vehicle and/or of the first additional vehicle, or the processor is designed to determine the first distance interval on the basis of learned distance values. As a result, the advantage is achieved that the first distance interval can be used efficiently for the most precise detection possible of the second additional vehicle.

According to one embodiment, the processor is designed to determine a time duration of the equally formed movement of the vehicle and the first additional vehicle, wherein the processor is further designed to determine an existence probability of the second additional vehicle on the basis of the determined time duration of the equally formed movement. As a result, the advantage is achieved that an existence probability of the second additional vehicle can be efficiently determined.

The processor can further be designed to determine the existence probability of the second additional vehicle on the basis of a number and/or a strength of accelerations of the vehicle and/or of the first additional vehicle.

According to one embodiment, the processor is designed, on the basis of the respective positions of the vehicle and of the first additional vehicle, to determine a distance between the first additional vehicle and the vehicle, wherein the processor is designed in response to a determination of the distance between the vehicle and the first additional vehicle, which lies within a second distance interval, and a simultaneous determination of an equally formed movement of the vehicle and of the second additional vehicle, to detect the second additional vehicle and a third additional vehicle between the vehicle and the first additional vehicle. As a result, the advantage is achieved that a plurality of vehicles, which in particular transmit no V2X communication data, can be efficiently detected between the vehicle and the first additional vehicle.

The second distance interval can be statical value. Further, the processor can be designed to determine the second distance interval dynamically on the basis of the driving situation of the vehicle and/or of the first additional vehicle, or the second distance interval on the basis of learned distance values.

According to one embodiment, the processor is designed, in response to the detection of the second additional vehicle, to transmit a detection signal to a driver assistance system of the vehicle, in particular a distance monitoring system. As a result, the advantage is achieved that the driver assistance system can be implemented efficiently with the knowledge of the second additional vehicle.

The processor can be designed to only transmit the detection signal when the second additional vehicle is detected with an existence probability which lies above a probability threshold.

According to one embodiment, the processor is designed to generate further V2X communication data on the basis of the determined driving situation of the vehicle, wherein the additional V2X communication data defines the driving situation of the vehicle, wherein the processor is designed to trigger the communication interface for transmitting the additional V2X communication data. As a result, the advantage is determined that other vehicles with a V2X communication system can determine the driving situation of the vehicle in order to themselves detect vehicles on the basis of the driving situation of the vehicle and their own driving situation.

According to one second aspect, the invention relates to a method for a vehicle for determining a traffic situation, with the determination of a driving situation of the vehicle, the receipt of V2X communication data of a first additional vehicle, wherein the V2X communication data defines a driving situation of the first additional vehicle, and the detection of a second additional vehicle which is located between the vehicle and the first additional vehicle, on the basis of the determined driving situation of the vehicle and the driving situation of the first additional vehicle. As a result, the advantage is achieved that a further vehicle which itself does not transmit V2X communication data can be efficiently detected. In response to the detection of the additional vehicle, a safety function and/or a driver assistance system of the vehicle can be triggered. The detection of the second additional vehicle can comprise a determination and/or an estimation or assessment of the existence of the second additional vehicle.

According to a third aspect, the invention relates to a vehicle, in particular a motor vehicle, with a communication system according to the first aspect of the invention.

The invention can be realized as hardware and/or software.

BRIEF DESCRIPTION OF THE DRAWINGS

Further exemplary embodiments will be explained in greater detail below with reference to the appended figures, in which.

DETAILED DESCRIPTION OF THE PREFERRED EMBODIMENTS

In the following detailed description, reference is made to the appended drawings, which form a part of said description and in which specific embodiments are shown for clarification, in which the invention can be implemented. It is clear that other embodiments can also be used, and structural or logical changes can be made without deviating from the concept of the present invention. The following detailed description is therefore not to be understood in a restricting sense. Further, it is clear that the features of the different exemplary embodiments described here can be combined with each other, insofar as no other specific information is given.

The aspects and embodiments are described with reference to the drawings, wherein the same reference numerals generally relate to the same elements. In the following description, numerous specific details are shown for explanation purposes, in order to communicate a clearer understanding of one or more aspects of the invention. For a person specialized in the art, however, it can be obvious that one or more aspects or embodiments can be implemented with a lower degree of the specific details. In other cases, known structures and elements are shown in schematic form, in order to make the description of one or more aspects or embodiments easier. It is clear that other embodiments can be used, and structural or logical changes can be made without deviating from the concept of the present invention.

If at the same time a certain feature or a certain aspect of an embodiment may be disclosed with reference to just one of several implementations, such a feature or such an aspect can also be combined with one or more other features or aspects of the other implementations, as can be desired and advantageous for a given or specific application. Further, to the extent in which the expressions "contain", "have", "with" or other variants of these are used, either in the detailed description or in the claims, such expressions can be inclusive in a manner similar to the expression "comprise". The expressions "coupled" and "connected" can be used together with derivations of these. It is clear that such expressions are used in order to demonstrate that two elements can cooperate or interact with each other independently of this, whether they are in direct physical or electrical contact or not in direct contact with each other. Additionally, the expression "as an example" should merely be understood as an example, instead of a description of the best or optimal. The following description is therefore not to be understood in a restricting sense.

Figure 1:
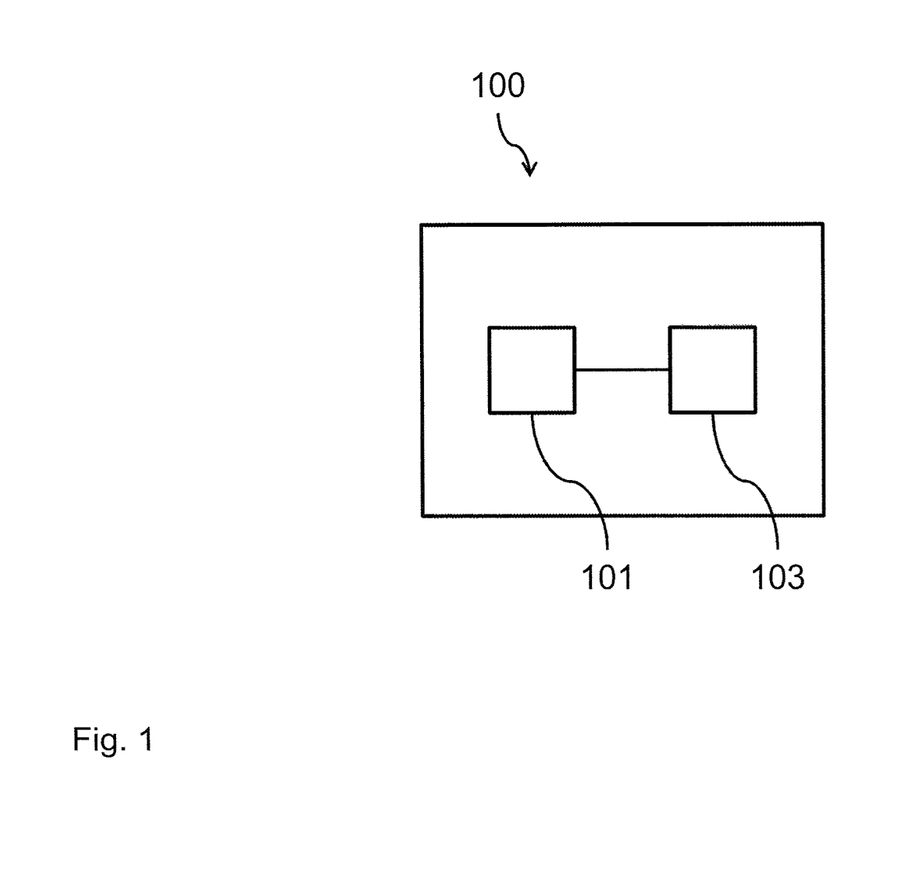
FIG. 1 shows a schematic view of a communication system for a vehicle.

FIG. 1 shows a schematic view of a communication system 100 for a vehicle according to one embodiment.

The communication system 100 comprises a processor 101 designed to determine a driving situation of the vehicle, and a communication interface 103 designed to receive V2X communication data of a first additional vehicle, wherein the V2X communication data defines a driving situation of the first additional vehicle, wherein the processor 101 is designed to detect a second additional vehicle which is located between the vehicle and the first additional vehicle on the basis of the determined driving situation of the vehicle and the driving situation of the first additional vehicle.

The detection of the second additional vehicle can comprise a determination and/or an estimation or assessment of the existence of the second additional vehicle.

The vehicle, the first additional vehicle and the second additional vehicle can respectively be a motor vehicle, in particular a multi-track motor vehicle such as a passenger car, a lorry or a bus, or a single-track motor vehicle such as a motorbike. Further, the vehicle, the first additional vehicle and the second additional vehicle can respectively be designed for autonomous or highly automated forward movement.

The vehicle and the first additional vehicle can respectively be equipped with a V2X communication system, via which V2X communication data is periodically transmitted. The transmitted V2X communication data can respectively comprise information on the current driving situation of the vehicle or the first additional vehicle. The second additional vehicle is for example a vehicle without a V2X communication system, and does not transmit any V2X communication data.

The communication system 100 can here be integrated into the V2X communication system of the vehicle 200, or be implemented as a V2X communication system of the vehicle 200.

The communication interface 103 can be a wireless V2X communication interface. The communication interface 103 can be connected with at least one vehicle antenna, and can be designed for receiving and/or transmitting V2X communication data. The communication interface 103 can be connected with a V2X communication chip of the vehicle, or be integrated in a V2X communication chip of the vehicle.

The processor 101 can be integrated in an electronic control unit (ECU) of the vehicle, or can be implemented as a control unit of the vehicle. The processor 101 can further comprise a microprocessor, or be implemented as a microprocessor.

The processor 101 can be connected using communications technology with the communication interface 103, in order to receive the V2X communication data which defines the driving situation of the first additional vehicle. The processor 101 can be designed to evaluate the V2X communication data in order to determine the driving situation of the first additional vehicle. The processor 101 and the communication interface 103 can be respectively connected to a communication network of the vehicle, in particular a vehicle bus.

The V2X communication data can comprise driving data and/or position data of the first additional vehicle.

The processor 101 can further receive communication data via the communication network, in particular sensor data, and determine the driving situation of the vehicle on the basis of the received communication data. The communication data can originate from vehicle sensors, such as wheel speed sensors, acceleration sensors, distance sensors or GNSS sensors, which are also connected to the communication network.

The processor 101 can be designed, on the basis of the communication data received via the communication network, in particular the sensor data, to determine the driving situation. The determined driving situation can comprise information about a current speed, an acceleration, a distance to other vehicles and/or a topographical position of the vehicle.

Figure 2:
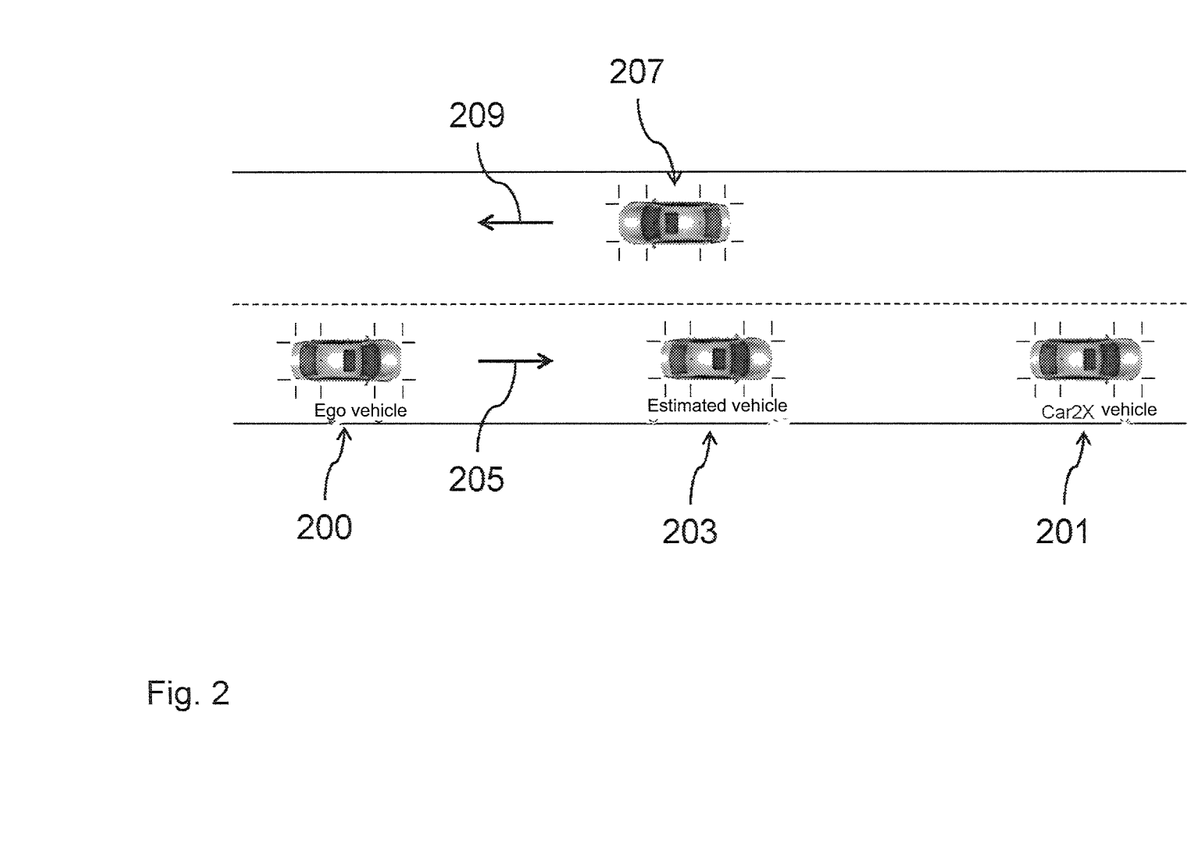
FIG. 2 shows a schematic view of a vehicle with the communication system from FIG. 1 in a traffic situation.

FIG. 2 shows a schematic view of a vehicle 200 with the communication system 100 from FIG. 1 in a traffic situation according to one embodiment.

The vehicle 200 moves in the direction of movement 205 in FIG. 2. A first additional vehicle 201 is located in front of the vehicle 200. The first additional vehicle 201 can be a V2X vehicle or a Car2X vehicle, which features a V2X communication system and transmits V2X communication data. FIG. 2 further shows a second additional vehicle 203, which features no V2X communication system and which transmits no V2X communication data. The existence of this second additional vehicle 203 can be detected by the processor 101.

FIG. 2 further shows an oncoming vehicle 207 on a counter-lane, which moves in an opposite direction of movement 209 to the direction of movement 205 of the vehicle 200. The oncoming vehicle 207 can be an additional V2X vehicle with a V2X communication system.

According to one embodiment, the processor 101 is designed to estimate the existence and/or the position of the second additional vehicle 203. For this purpose, the processor 101 can evaluate V2X communication data from V2X vehicles, in particular additional vehicles with V2X communication systems such as that of the first additional vehicle 201 in FIG. 2. The V2X communication data can here define a driving situation of the V2X vehicles, such as a speed, an acceleration, a position or a direction of movement.

In response to the detection of the second additional vehicle 203 by the processor 101, critical traffic situations can for example be detected early, or the critical nature of traffic situations can be estimated more precisely than would be possible without taking into account the estimated vehicle 203. The driver of the observed vehicle 200 can be warned in critical situations. Further, the observing vehicle 200 can be autonomously braked in order to prevent or minimize an accident caused by impact from behind.

According to one embodiment, the processor 101 is designed to use the V2X communication data or the driving situation of a V2X vehicle 201 defined by the V2X communication data, such as of the first additional vehicle 201, only to detect the second additional vehicle 203, when the V2X vehicle fulfills at least one of the following conditions:

(i) The V2X vehicle 201 is located on the same driving lane as the vehicle 200.
(ii) The V2X vehicle 201 drives in the same direction of movement 205 or the driving direction as the vehicle 200.
(iii) The V2X vehicle 201 drives in the same driving direction in front of the vehicle 200.
(iv) The V2X vehicle 201 and the vehicle 200 are in a following driving situation. In a following driving situation, the vehicle 200 and the V2X vehicle 201 move with a constant distance, within a distance interval, with the same speed (within a speed interval), and with the same braking and acceleration behavior (within an acceleration interval).

The conditions (i) to (iv) are fulfilled in FIG. 2 by the first additional vehicle 201 for example. The oncoming vehicle 207 does not for example fulfill the above conditions (i) to (iv). Thus, the processor 101 in the traffic situation shown as an example in FIG. 2 would only take into account communication data of the V2X vehicle 201 for detecting the second additional vehicle 203.

According to one embodiment, the driving data of a further vehicle, such as the first additional vehicle 201, is only used for detecting the second additional vehicle 203 when the V2X vehicle 201 is located at a certain distance (within a dynamically adapted interval) to the vehicle 200. The processor 101 can calculate the distance between the vehicle 200 and the V2X vehicle 201 on the basis of vehicle data of the vehicle 200, such as the position data of a navigation facility, and the V2X communication data of the V2X vehicle 201, which can also comprise position data.

According to one embodiment, the processor 101 is designed to determine whether the V2X vehicle 201, the V2X communication data of which is received by the communication interface 103, is located on the same driving lane as the vehicle 200. For this purpose, the processor 101 can, on the basis of the driving situation of the vehicle 200 and of the V2X vehicle 201, determine a movement trajectory of the respective vehicles. For this purpose, the processor 101 can use position data and movement data, and further available data such as a steering degree. The processor 101 can determine that the vehicle 200 and the V2X vehicle 201 are located on the same driving lane when their movement trajectories (within a dynamically adapted interval) overlap.

The processor 101 can be designed to use the V2X communication data or the driving situation of the V2X vehicle 201 only for detecting the second additional vehicle 203 when the vehicle 200 and the V2X vehicle 201 move on the same driving lane as shown in FIG. 2.

According to one embodiment, the processor 101 is designed to determine whether the V2X vehicle 201, the V2X communication data of which is received by the communication interface 103, is moving in the same direction of movement 205 as the vehicle 200. In order to determine the direction of movement of the vehicle 200 and the V2X vehicle 201, the processor 101 can compare the position data and movement data of the respective vehicles. The processor 101 can determine that the vehicle 200 and the V2X vehicle 201 are moving in the same direction when their directions of movement are the same within a dynamically adapted interval.

The processor 101 can be designed to use the V2X communication data or the driving data of the V2X vehicle 201 only for detecting the second additional vehicle 203 when the vehicle 200 and the V2X vehicle 201 move in the same direction of movement 205 as shown in FIG. 2.

According to one embodiment, the processor 101 is designed to determine whether the V2X vehicle 201, the V2X communication data of which is received by the communication interface 103, is driving in front of the vehicle 200. The processor 101 can determine that the V2X vehicle 201 is driving in front of the vehicle 200 when the distance between the V2X vehicle 201 and the vehicle 200 is greater in the direction of movement than a threshold value (within a dynamically adapted interval). The distance between the vehicle 200 and the V2X vehicle 201 can be determined on the basis of position data of the vehicle 200 and the V2X vehicle 201.

The processor 101 can be designed to use the V2X communication data or the driving situation of the V2X vehicle 201 only for detecting the second additional vehicle 203 when the vehicle 201 is driving in front of the vehicle 200 as shown in FIG. 2.

According to one embodiment, the processor 101 is designed to determine whether the V2X vehicle 201, the V2X communication data of which is received by the communication interface 103, is moving in an equal form with the vehicle 200. The vehicle 200 and the V2X vehicle 201 move to equal forms when the following conditions are met:

(i) The speeds of the vehicle 200 and the V2X vehicle 201 are the same at a certain point in time (within a speed interval).
(ii) The accelerations (positive and negative) of the vehicle 200 and the V2X vehicle 201 are the same (within an acceleration interval) at a certain point in time, with a time displacement (within a time interval) between the V2X vehicle 201 and the vehicle 200.

According to one embodiment, the processor 101 is designed, in response to the determination of the equally formed movement of the vehicle 200 and the V2X vehicle 201, to determine whether the vehicle 200 and the V2X vehicle 201 are in a following driving situation. A following driving situation applies when the vehicle 200 and the V2X vehicle 201 move in an equal form over an observation time period, at the same distance, within a first distance interval. The observation time period extends over a certain time interval in the past.

The processor 101 can be designed to use the V2X communication data or the driving situation of the V2X vehicle 201 only for detecting the second additional vehicle 203 when the vehicle 201 is moving in an equal form to the vehicle 200 and/or is in a following driving situation with the vehicle 200.

The first distance interval and all additional intervals, such as the speed interval or the acceleration interval, are statical in the simplest case. In a further embodiment, the intervals are adapted by the processor 101 by a dynamic portion, depending on the current driving situation, such as the speed. In a further embodiment, the intervals are supplemented and/or scaled by learned values by the processor 101, for example on the basis of the driving behavior of the driver of the additional vehicle.

According to one embodiment, the processor 101 is designed, in response to the determination of a following driving situation of the vehicle 200 and the V2X vehicle 201, to detect an additional vehicle 203 without a V2X communication system, which is located between the vehicle and the additional vehicle, when the distance of the vehicles 200, 201 is within the first distance interval during the following driving situation.

According to one embodiment, the processor 101 is designed, in response to the determination of a following driving situation of the vehicle 200 and the V2X vehicle 201, to detect several additional vehicles without a V2X communication system, which are located between the vehicle and the additional vehicle, when the distance of the vehicles 200, 201 is within a second distance interval during the following driving situation.

According to one embodiment, the processor 101 is designed, when detecting a vehicle without a V2X communication system, such as the first additional vehicle 203 in FIG. 2, to determine an existence probability of the estimated vehicle. The existence probability of an estimated vehicle increases with the duration of the following driving situation. The existence probability of an estimated vehicle increases in particular with the number of determined accelerations (positive or negative) of the vehicle 200 and the V2X vehicle 201, the V2X communication data of which is being received. The existence probability of an estimated vehicle further increases in particular with the strength of accelerations (positive or negative) of the vehicle 200 and the V2X vehicle 201.

According to one embodiment, the processor 101 can also determine the existence probability on the basis of the recently observed time displacement between the accelerations of the vehicle 200 and the V2X vehicle 201. For example, a greater delay is created for example by the multiple reaction time with multiple vehicles, and thus increases the existence probability of estimated vehicles.

Significant changes in the distance between the vehicle 200 and the V2X vehicle 201, which cannot be explained solely by a changed column speed, for example, can be used to form a lane entrance or lane exit hypothesis. On the basis of the lane entrance or lane exit hypothesis, the existence probability can be adapted or determined more quickly than purely via the distance intervals.

According to one embodiment, the processor 101 is designed to use additional data of the V2X vehicle 201 driving in front, for example a vehicle class (motorbike, passenger car, bus, lorry) or a vehicle length, in order to more precisely selected the distance intervals and existence probabilities.

According to one embodiment, an estimation of vehicles without a V2X communication system takes place not only between the own vehicle 200 and a V2X vehicle 201, but also directly between other V2X vehicles in a following driving situation.

According to one embodiment, a V2X vehicle 201 driving in front transmits warning messages which refer to the strong braking of the V2X vehicle 201. The point in time and the type of warning of the driver of the vehicle 200 are adapted on the basis of estimated vehicles. Thus, an early warning occurs in particular when one additional or several additional vehicles are estimated between the braking V2X vehicle driving in front and the own vehicle 200, since in this case, the reaction time available is less than if the additional vehicles were not present, and the probability is higher that the driver cannot themselves recognize the braking procedure.

Figure 3:
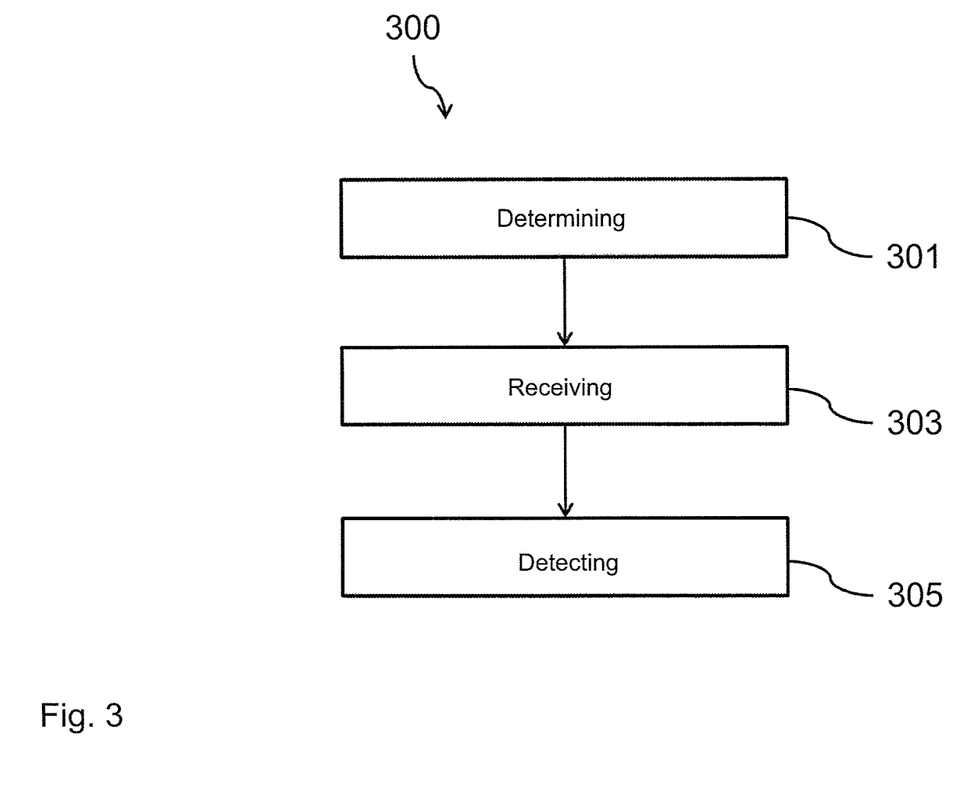
FIG. 3 shows a process diagram of a method for a vehicle for determining a traffic situation.

FIG. 3 shows a flow chart of a method 300 for a vehicle 200 for determining a traffic situation according to an embodiment.

The method 300 comprises a determination 301 of a driving situation of the vehicle 200, a receiving 303 of V2X communication data of a first additional vehicle 201, wherein the V2X communication data defines a driving situation of the first additional vehicle 201, and a detecting 305 of a second additional vehicle 203 which is located between the vehicle 200 and the first additional vehicle 201 on the basis of the determined driving situation of the vehicle 200 and the driving situation of the first additional vehicle 201.

LIST OF REFERENCE NUMERALS

100 Communication system
101 Processor
103 Communication interface
200 Vehicle
201 First additional vehicle
203 Second additional vehicle
205 Direction of movement of the vehicle
207 Oncoming vehicle
209 Direction of movement of the oncoming vehicle
300 Method for a vehicle for determining a traffic situation
301 Determining
303 Receiving
305 Detecting

The invention claimed is:

1. A communication system for a vehicle, comprising: a processor, which is designed to determine a driving situation of the vehicle, wherein the determined driving situation of the vehicle comprises one of a speed, an acceleration, a position, a direction of movement or a distance from other vehicles of the vehicle, and
a communication interface, which is designed to receive V2X communication data from a first additional vehicle, wherein the V2X communication data define a driving situation of the first additional vehicle, wherein the driving situation of the first additional vehicle comprises one of a speed, an acceleration, a position, a direction of movement or a distance from other vehicles of the first additional vehicle,
wherein the processor is designed to determine that the first additional vehicle is positioned in front of the vehicle based on the determined driving situation of the vehicle and the driving situation of the first additional vehicle defined by the V2X communication data,
wherein the processor is designed to detect a second additional vehicle, which is located between the vehicle and the first additional vehicle, on the basis of the determined driving situation of the vehicle and the driving situation of the first additional vehicle,
and wherein the processor is designed, on the basis of the respective positions of the vehicle and the first additional vehicle to determine a distance between the first additional vehicle and the vehicle, and to use this for detecting the second additional vehicle when the distance between the vehicle and the first additional vehicle lies within a first distance interval without doing any additional measurements between the vehicle and the second additional vehicle and the vehicle follows the second additional vehicle and the second additional vehicle follows the first additional vehicle.

2. The communication system according to claim 1, wherein the processor can be connected to a communication network of the vehicle, in particular a vehicle bus, wherein the processor is designed to receive communication data, in particular sensor data, via the communication network, and to determine the driving situation of the vehicle on the basis of the communication data received.

3. The communication system according to claim 1, wherein the processor is designed, on the basis of the respective position and the respective speed of the vehicle and of the first additional vehicle, to determine a movement direction of the vehicle and of the first additional vehicle, wherein the processor is designed to refer to the driving situation of the first additional vehicle only for the purpose of detecting the second additional vehicle, when the respective movement directions of the vehicle and the first additional vehicle are the same, in particular the same for a first time interval.

4. The communication system according to claim 3, wherein the processor is designed, on the basis of the respective position and the respective speed of the vehicle and of the first additional vehicle, to determine a movement direction of the vehicle and of the first additional vehicle, wherein the processor is designed to refer to the driving situation of the first additional vehicle only for the purpose of detecting the second additional vehicle, when the first additional vehicle is located in the driving direction in front of the vehicle, in particular when it is located in the driving direction in front of the vehicle for a second time interval.

5. The communication system according to claim 3, wherein the processor is designed, on the basis of the position of the vehicle and the position of the first additional vehicle, to determine whether the vehicle and the first additional vehicle are located on a same driving lane, wherein the processor is designed to refer to the driving situation of the first additional vehicle only for the purpose of detecting the second additional vehicle, when the vehicle and the first additional vehicle are located on the same driving lane, in particular when they are located for a third time interval on the same driving lane.

6. The communication system according to claim 3, wherein the determined driving situation of the vehicle and the driving situation of the first additional vehicle defined by the V2X communication data can further comprise an acceleration of the vehicle or of the first additional vehicle, wherein the processor is designed to determine an equally formed movement of the vehicle and of the first additional vehicle when the speed of the vehicle and of the first additional vehicle lies for a fifth time interval within a speed interval, and when the acceleration of the vehicle and of the first additional vehicle lies for a sixth time interval, in particular with a time delay, within an acceleration interval.

7. The communication system according to claim 6, wherein the processor is designed in response to a determination of a distance between the vehicle and the first additional vehicle, which lies within the first distance interval, and a simultaneous determination of an equally formed movement of the vehicle and of the first additional vehicle, to detect the second additional vehicle between the vehicle and the first additional vehicle.

8. The communication system according to claim 7, wherein the first distance interval is a statical value, or the processor is designed to determine the first distance interval dynamically on the basis of the driving situation of the vehicle and/or of the first additional vehicle, or the processor is designed to determine the first distance interval on the basis of learned distance values.

9. The communication system according to claim 6, wherein the processor is designed to determine a time duration of the equally formed movement of the vehicle and the first additional vehicle, wherein the processor is further designed to determine an existence probability of the second additional vehicle on the basis of the determined time duration of the equally formed movement.

10. The communication system according to claim 6, wherein the processor is designed, on the basis of the respective positions of the vehicle and of the first additional vehicle, to determine a distance between the first additional vehicle and the vehicle, wherein the processor is designed in response to a determination of the distance between the vehicle and the first additional vehicle, which lies within a second distance interval, and a simultaneous determination of an equally formed movement of the vehicle and of the second additional vehicle, to detect the second additional vehicle and a third additional vehicle between the vehicle (200) and the first additional vehicle.

11. The communication system according to claim 1, wherein the processor is designed, in response to the detection of the second additional vehicle, to transmit a detection signal to a driver assistance system of the vehicle, in particular a distance monitoring system.

12. The communication system according to claim 1, wherein the processor is designed to generate further V2X communication data on the basis of the determined driving situation of the vehicle, wherein the additional V2X communication data defines the driving situation of the vehicle, wherein the processor is designed to trigger the communication interface for transmitting the additional V2X communication data.

13. A method for a vehicle for determining a traffic situation, comprising:

determining of a driving situation of the vehicle, wherein the driving situation of the vehicle comprises one of a speed, an acceleration, a position, a direction of movement or a distance from other vehicles of the vehicle, receiving of V2X communication data of a first additional vehicle, wherein the V2X communication data defines a driving situation of the first additional vehicle, wherein the driving situation of the first additional vehicle comprises one of a speed, an acceleration, a position, a direction of movement or a distance from other vehicles of the first additional vehicle, determining that the first additional vehicle is positioned in front of the vehicle based on the determined driving situation of the vehicle and the driving situation of the first additional vehicle defined by the V2X communication data, detecting a second additional vehicle, which is located between the vehicle and the first additional vehicle, on the basis of the determined driving situation of the vehicle and the driving situation of the first additional vehicle;

determining a distance between the first additional vehicle and the vehicle; and using the second additional vehicle for detecting when the distance between the vehicle and the first additional vehicle lies within a first distance interval without doing any additional measurements between the vehicle and the second additional vehicle and the vehicle follows the second additional vehicle and the second additional vehicle follows the first additional vehicle.

14. A motor vehicle, in particular a motor vehicle, with a communication system comprising:

a processor, which is designed to determine a driving situation of the vehicle, wherein the determined driving situation of the vehicle comprises one of a speed, an acceleration, a position, a direction of movement or a distance from other vehicles of the vehicle, and a communication interface, which is designed to receive V2X communication data from a first additional vehicle, wherein the V2X communication data define a driving situation of the first additional vehicle, wherein the driving situation of the first additional vehicle comprises one of a speed, an acceleration, a position, a direction of movement or a distance from other vehicles of the first additional vehicle, wherein the processor is designed to determine that the first additional vehicle is positioned in front of the vehicle based on the determined driving situation of the vehicle and the driving situation of the first additional vehicle defined by the V2X communication data, wherein the processor is designed to detect a second additional vehicle, which is located between the vehicle and the first additional vehicle, on the basis of the determined driving situation of the vehicle and the driving situation of the first additional vehicle, and wherein the processor is designed, on the basis of the respective positions of the vehicle and the first additional vehicle to determine a distance between the first additional vehicle and the vehicle, and to use this for detecting the second additional vehicle when the distance between the vehicle and the first additional vehicle lies within a first distance interval without doing any additional measurements between the vehicle and the second additional vehicle and the vehicle follows the second additional vehicle and the second additional vehicle follows the first additional vehicle.

15. The communication system according to claim 4, wherein the processor is designed, on the basis of the position of the vehicle and the position of the first additional vehicle, to determine whether the vehicle and the first additional vehicle are located on a same driving lane, wherein the processor is designed to refer to the driving situation of the first additional vehicle only for the purpose of detecting the second additional vehicle, when the vehicle and the first additional vehicle are located on the same driving lane, in particular when they are located for a third time interval on the same driving lane.

16. The communication system according to claim 4, wherein the determined driving situation of the vehicle and the driving situation of the first additional vehicle defined by the V2X communication data can further comprise an acceleration of the vehicle or of the first additional vehicle, wherein the processor is designed to determine an equally formed movement of the vehicle and of the first additional vehicle when the speed of the vehicle and of the first additional vehicle lies for a fifth time interval within a speed interval, and when the acceleration of the vehicle and of the first additional vehicle lies for a sixth time interval, in particular with a time delay, within an acceleration interval.

17. The communication system according to claim 5, wherein the determined driving situation of the vehicle and the driving situation of the first additional vehicle defined by the V2X communication data can further comprise an acceleration of the vehicle or of the first additional vehicle, wherein the processor is designed to determine an equally formed movement of the vehicle and of the first additional vehicle when the speed of the vehicle and of the first additional vehicle lies for a fifth time interval within a speed interval, and when the acceleration of the vehicle and of the first additional vehicle lies for a sixth time interval, in particular with a time delay, within an acceleration interval.

18. The communication system according to claim 7, wherein the processor is designed to determine a time duration of the equally formed movement of the vehicle and the first additional vehicle, wherein the processor is further designed to determine an existence probability of the second additional vehicle on the basis of the determined time duration of the equally formed movement.

19. The communication system according to claim 8, wherein the processor is designed to determine a time duration of the equally formed movement of the vehicle and the first additional vehicle, wherein the processor is further designed to determine an existence probability of the second additional vehicle on the basis of the determined time duration of the equally formed movement.

* * * * *